US012591396B2

(12) United States Patent
Khanna

(10) Patent No.: US 12,591,396 B2
(45) Date of Patent: Mar. 31, 2026

(54) DATA STORAGE DEVICE WITH PRE-ERASE OF METADATA FROM NON-VOLATILE MEMORY

(71) Applicant: WESTERN DIGITAL TECHNOLOGIES, INC., San Jose, CA (US)

(72) Inventor: Shubhi Khanna, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/820,819

(22) Filed: Aug. 30, 2024

(65) Prior Publication Data

US 2026/0064315 A1    Mar. 5, 2026

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS 8,947,813 B2    2/2015  Chatradhi et al.
9,058,280 B1 *  6/2015  Boyle ..................... G06F 3/068

| 9,778,848 B2 | 10/2017 | Ramalingam |
| 10,366,711 B1 | 7/2019 | Liu et al. |
| 11,237,732 B2 | 2/2022 | Natarajan et al. |
| 11,482,253 B1 | 10/2022 | Chen et al. |
| 11,694,721 B2 | 7/2023 | Flaishman et al. |
| 11,816,349 B2 | 11/2023 | Grin et al. |
| 2012/0117309 A1 | 5/2012 | Schutte |
| 2021/0096762 A1 | 4/2021 | Rori et al. |
| 2022/0066926 A1 | 3/2022 | D'Eliseo et al. |
| 2022/0317914 A1 | 10/2022 | Kulkarni et al. |
| 2023/0090319 A1 | 3/2023 | B N et al. |

OTHER PUBLICATIONS

Western Digital, "How Western Digital CreatedOptiNAND™, a New Flash-Enhanced HDD Architecture", https://blog.westerndigital.com/optinand/, dated Aug. 31, 2021; 12 pages.

(Continued)

*Primary Examiner* — Larry T Mackall
(74) *Attorney, Agent, or Firm* — Calderon Safran & Wright P.C.

(57)    ABSTRACT

Various illustrative aspects are directed to a data storage device, method, and one or more processing devices that are configured to: send a first command to a non-volatile memory in response to determining that a seek time associated with a seek operation exceeds a threshold; and send a second command to the non-volatile memory at or before an end of the seek operation, wherein the non-volatile memory is configured to begin performing a pre-erase operation of one or more blocks in the non-volatile memory in response to receiving the first command, and the non-volatile memory is configured to cease performing the pre-erase operation in response to receiving the second command.

20 Claims, 6 Drawing Sheets

(56) References Cited

OTHER PUBLICATIONS

Janukowicz et al., "Storage Device Reliability and Endurance", IDC Analyze Future, https://www.seagate.com/files/staticfiles/docs/pdf/whitepaper/storage-device-longevity-us.pdf, Aug. 2010; 9 pages.
Miller, "Explained: OptiNAND", https://blog.westerndigital.com/optinand-explained/, dated Jun. 27, 2023; 3 pages.

* cited by examiner

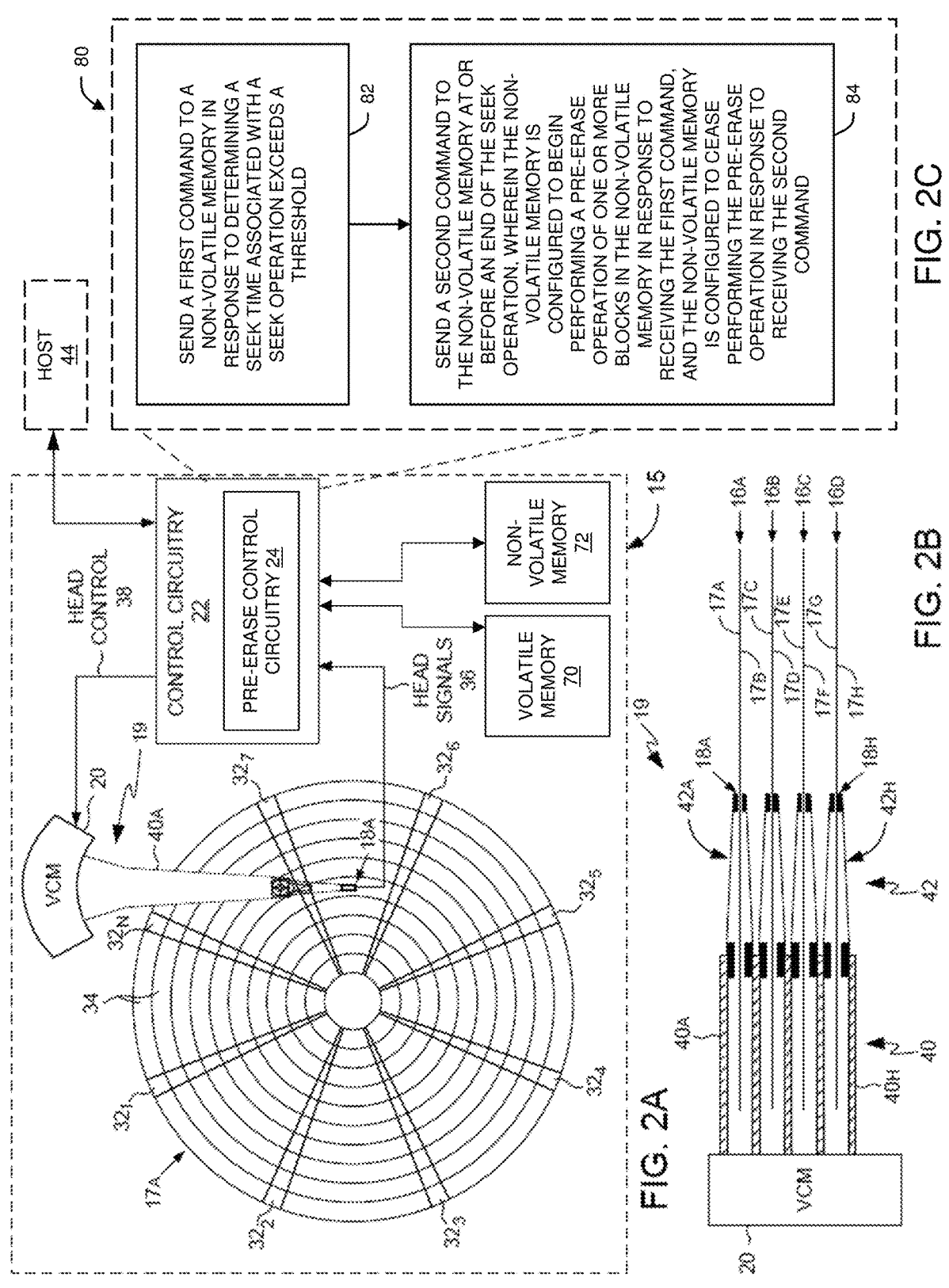

HOST
44

80

SEND A FIRST COMMAND TO A NON-VOLATILE MEMORY IN RESPONSE TO DETERMINING A SEEK TIME ASSOCIATED WITH A SEEK OPERATION EXCEEDS A THRESHOLD

82

SEND A SECOND COMMAND TO THE NON-VOLATILE MEMORY AT OR BEFORE AN END OF THE SEEK OPERATION, WHEREIN THE NON-VOLATILE MEMORY IS CONFIGURED TO BEGIN PERFORMING A PRE-ERASE OPERATION OF ONE OR MORE BLOCKS IN THE NON-VOLATILE MEMORY IN RESPONSE TO RECEIVING THE FIRST COMMAND, AND THE NON-VOLATILE MEMORY IS CONFIGURED TO CEASE PERFORMING THE PRE-ERASE OPERATION IN RESPONSE TO RECEIVING THE SECOND COMMAND

CONTROL CIRCUITRY 22

PRE-ERASE CONTROL CIRCUITRY 24

HEAD CONTROL 38

HEAD SIGNALS 36

NON-VOLATILE MEMORY 72

VOLATILE MEMORY 70

15

VCM
20

DATA STORAGE DEVICE WITH PRE-ERASE OF METADATA FROM NON-VOLATILE MEMORY

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks is defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which enables proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive pre-erasing of blocks in non-volatile memory used to store metadata for the data storage device. In various examples, control circuitry of this disclosure is inventively configured to opportunistically pre-erase blocks in the non-volatile memory prior to the blocks being allocated for a write process. By pre-erasing blocks prior to the blocks being allocated for and used in a write process, the time spent performing the write process is reduced since the write process no longer includes the step of erasing the allocated blocks. In this manner, implementations improve the performance of a disk drive by reducing the latency of a write process in the non-volatile memory. Various illustrative aspects are directed to a data storage device, comprising: one or more disks; a non-volatile memory; an actuator mechanism configured to position one or more heads proximate to a corresponding disk surface of a corresponding disk of the one or more disks; and one or more processing devices. The one or more processing devices, individually or in combination, are configured to: send a first command to the non-volatile memory in response to determining that a seek time associated with a seek operation exceeds a threshold; and send a second command to the non-volatile memory at or before an end of the seek operation; wherein the non-volatile memory is configured to: in response to receiving the first command, begin performing a pre-erase operation of one or more blocks in the non-volatile memory; and in response to receiving the second command, cease performing the pre-erase operation.

Various illustrative aspects are directed to a method comprising: sending a first command to a non-volatile memory in a data storage device that comprises one or more disks, wherein the sending the first command is in response to a seek time associated with a seek operation exceeding a threshold; and sending a second command to the non-volatile memory at or before an end of the seek operation, wherein the non-volatile memory is configured to: in response to receiving the first command, begin performing a pre-erase operation of one or more blocks in the non-volatile memory; and in response to receiving the second command, cease performing the pre-erase operation; and wherein the sending the first command and the sending the second command are performed by one or more processing devices individually or in combination.

Various illustrative aspects are directed to one or more processing devices comprising: means for sending a first command to a non-volatile memory in response to determining that a seek time associated with a seek operation exceeds a threshold; and means for sending a second command to the non-volatile memory at or before an end of the seek operation, wherein the non-volatile memory is configured to: in response to receiving the first command, begin performing a pre-erase operation of one or more blocks in the non-volatile memory; and in response to receiving the second command, cease performing the pre-erase operation.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, in accordance with aspects of the present disclosure.

FIG. 2C shows a flowchart of an exemplary method that control circuitry of a disk drive may perform or execute in controlling the operations of the disk drive, in accordance with aspects of the present disclosure.

DETAILED DESCRIPTION

Figure 1:
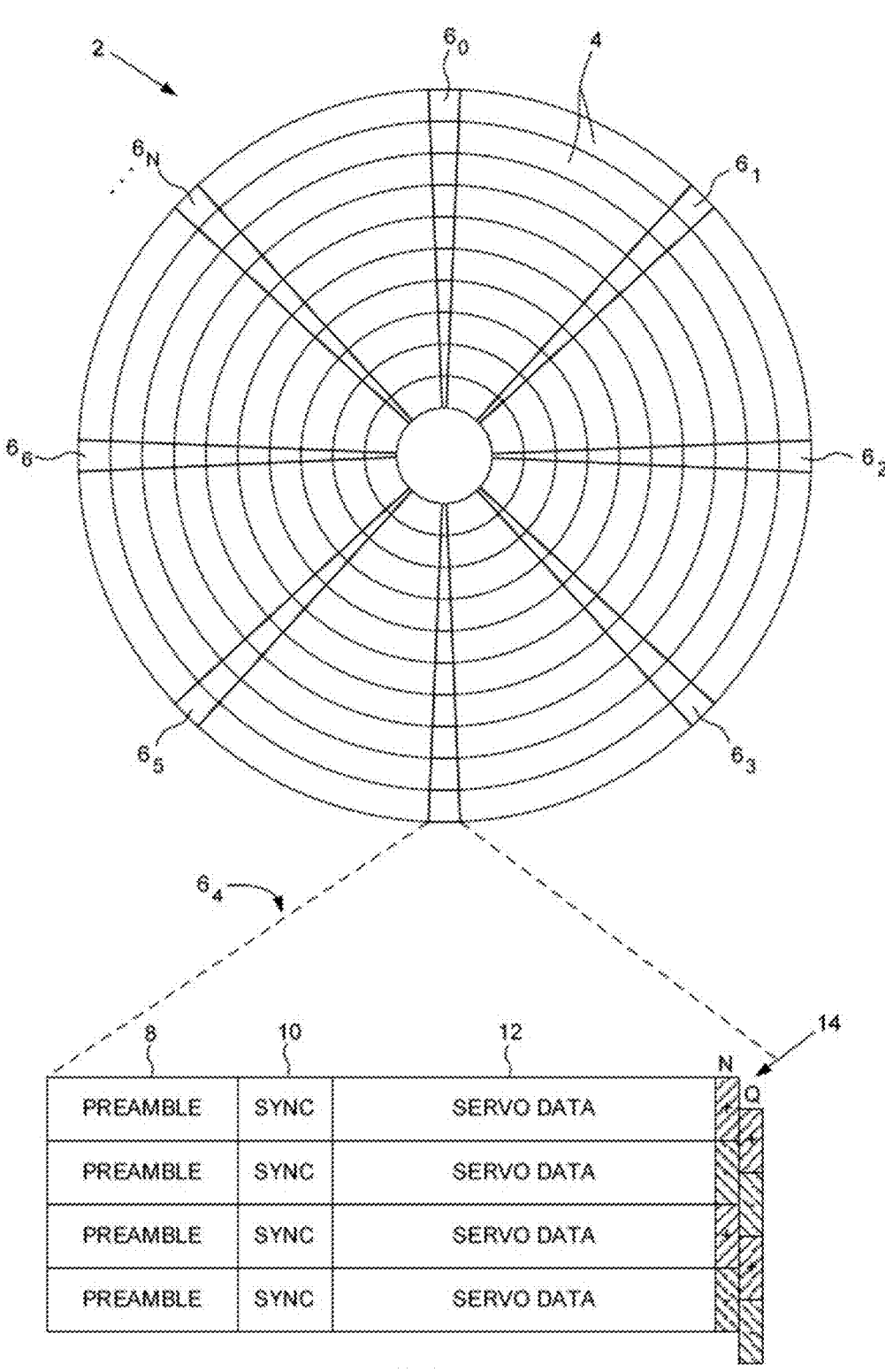
FIG. 1 shows a prior art disk format as comprising a number of radially-spaced, concentric servo tracks defined by servo wedges recorded around the circumference of each servo track.

Embodiments of the present disclosure relate generally to data storage devices, such as hard disk drives (HDDs) and, more specifically, to efficient handling of HDD metadata in non-volatile memory of the HDD.

In order to reduce HDD cost, track densities of the HDD have increased for each generation of HDD, which requires more sophisticated algorithms to enable reliable storage and retrieval of the data. The algorithms use various types of metadata and calibration data to overcome issues, such as head positioning errors, track miss-registration, adjacent track interference, head run out, vibrations from airflow and spindle, disk warpage, electronic noise, thermal noise, and the like. Metadata may be in a size of about 40 gigabyte (GB) for a 20+terabyte (TB) HDD.

A hybrid drive, such as a solid state hybrid drive (SSHD), may leverage both HDD components and solid state drive (SSD) components to store user data, which can provide increased performance and storage capacities that neither HDD nor SSD may optimally achieve by itself. For example, the hybrid drive may include a magnetic disk with a read/write head, a non-volatile memory (NVM), such as NAND flash memory, and volatile memory, such as static random-access memory (SRAM) and dynamic random-access memory (DRAM). User data for the hybrid drive is stored in both the HDD (e.g., magnetic disk) and SSD (e.g., NVM), whereas metadata for the hybrid drive may be stored in DRAM. However, because of the size of the metadata, the required amount of DRAM may be increased, driving increased costs and more power consumption. Moreover, the precision of the metadata is limited in DRAM, and this limited precision can have unwanted results such as, for example, performing adjacent track interference (ATI) refresh operations at an undesirably high frequency.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that pre-erase control circuitry 24 of control circuitry 22 may perform or execute in controlling the operations of disk drive 15, in accordance with aspects of the present disclosure, including controlling pre-erasing of blocks in non-volatile memory of disk drive 15.

Actuator arm assembly 19 comprises a primary actuator 20 (e.g., a voice coil motor (VCM)) and a number of actuator arms 40 (e.g., topmost actuator arm 40A, as seen in the top and side views of FIGS. 2A and 2B). Each of actuator arms 40 comprises a suspension assembly 42 at a distal end thereof (e.g., topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A and read/write head 18H suspended by lowest actuator arm 40H under lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over (or under) and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a head signals 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal (e.g., head control 38) applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In various examples, and with continued reference to FIG. 2A, disk drive 15 includes volatile memory 70 that may be used by control circuitry 22 to store cached information. An example of cached information includes, but is not limited to, a write cache of write commands received from host 44. Examples of volatile memory 70 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

In various embodiments, and with continued reference to FIG. 2A, disk drive 15 includes non-volatile memory (NVM) 72 that may be used by control circuitry 22 to store metadata of disk drive 15. NVM 72 may comprise a plurality of flash memory devices such as NAND flash memory devices that store data based on a charge contained in a floating gate of a transistor for each flash memory cell. Each flash memory device of NVM 72 may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NAND flash memory devices of NVM 72 may be two-dimensional (2D) or three-dimensional (3D) devices and may be single level cell (SLC), multi-level cell (MLC), triple level cell (TLC), quad level cell (QLC), or penta level cell (PLC). Control circuitry 22 may write data to and read data from flash memory devices of NVM 72 at the page level and erase data from flash memory devices of NVM 72 at the block level.

Metadata stored in NVM 72 may comprise at least one of repeatable run out (RRO) metadata, positioning error signal (PES) metadata, adjacent track interference (ATI) metadata, and/or emergency power off (EPO) metadata. The metadata may be classified based on a data type and/or a data characteristic such as non-uniformly distributed data, write speed requirements, and endurance requirements. Non-uniformly distributed data may be manipulated using data shaping and content aware decoding. For example, centralized data is a type of non-uniformly distributed data. Write speed requirements may include determining which trim and/or partition of a SLC memory, MLC memory, TLC memory, QLC memory, and the like to program data to due to a programming speed associated with the data being programmed. For example, RRO metadata, PES metadata, ATI metadata, and EPO metadata may be types of data that have write speed requirements. Endurance requirements may differ between metadata types. For example, RRO metadata may not need high endurance memory because RRO metadata is written only once and therefore can be written to TLC memory. In another example, PES metadata and ATI metadata may require high endurance memory. It is to be understood that control circuitry 22 may use NVM 72 to store other types of metadata not described herein.

Compared to DRAM, flash memory is more cost-effective and can be implemented in far higher capacities. By storing drive metadata in NVM 72 instead of volatile memory 70, control circuitry 22 leverages the greater capacity of NVM 72 (compared to volatile memory 70) to improve drive performance associated with functions such as RRO correction, PES correction, and ATI refresh. In embodiments, NVM 72 has a larger capacity than volatile memory 70 and includes different memory partitions, such as SLC memory, MLC memory, TLC memory, QLC memory, PLC memory, and the like, for storage of different metadata types. For example, because RRO metadata is generated once and logged once, the RRO metadata may be programmed to TLC memory. Likewise, PES metadata, ATI metadata, and EPO metadata may be programmed to SLC memory due to endurance and speed concerns.

Writing metadata to NAND flash memory involves erasing one or more blocks of the NAND flash memory before writing data to the one or more blocks. This is because double-programming of blocks is not permitted in NAND flash memory, such that a block must be erased before new data can be written to it. Typically, in an HDD, this erasing is performed after the HDD controller issues the write request to the NAND flash memory. For example, a write operation to a NAND flash memory in an HDD may involve the NAND flash memory receiving a write request from the HDD controller, allocating a block for the write request, erasing the allocated block, and writing the data of the write request to the allocated block after the erasing. In this example, the total time taken by the NAND flash memory to complete the write operation includes an erase latency, i.e., the time taken to erase the block to which the metadata will be written. This erase latency can be on the magnitude of 5 milliseconds or more and, thus, may be considered as disadvantageous to the extent that it adds to the overall time spent performing the write operation to the NAND flash memory of the HDD.

Implementations of the present disclosure address this issue by opportunistically erasing blocks of NAND flash memory of NVM 72 during one or more operations of disk drive 15 when NVM 72 is otherwise idle. In this manner, the NAND flash memory of NVM 72 may include already-erased blocks before and when NVM 72 receives a write request from control circuitry 22. In embodiments, NVM 72 utilizes one or more such already-erased blocks of the NAND flash memory to complete a write operation received from control circuitry 22, thereby decreasing the overall time spent performing the write operation by eliminating the erase latency that otherwise would be included in such a write operation. In this manner, implementations of the present disclosure improve the performance of disk drive 15 by improving the speed of write operations of metadata to NVM 72.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, pre-erase control circuitry 24 of control circuitry 22 may send a first command to a non-volatile memory in response to determining that a seek time associated with a seek operation exceeds a threshold (82).

Pre-erase control circuitry 24 may further send a second command to the non-volatile memory at or before an end of the seek operation, wherein the non-volatile memory is configured to begin performing a pre-erase operation of one or more blocks in the non-volatile memory in response to receiving the first command, and the non-volatile memory is configured to cease performing the pre-erase operation in response to receiving the second command (84). Control circuitry 22, including pre-erase control circuitry 24, may further perform additional actions, methods, and techniques, in accordance with various aspects including as further described herein.

The term "pre-erase control circuitry 24" as used herein may refer to any hardware, firmware, software, and/or combination thereof, comprised in control circuitry 22 of disk drive 15, which implements, embodies, or engages in any of the structures or functions ascribed herein to pre-erase control circuitry 24 or to any other of the novel and inventive aspects of the present disclosure. Pre-erase control circuitry 24 may constitute any hardware, firmware, software, and/or any other elements of control circuitry 22 for controlling pre-erasing of blocks in non-volatile memory, and performing other techniques and methods as described herein.

Figure 3:
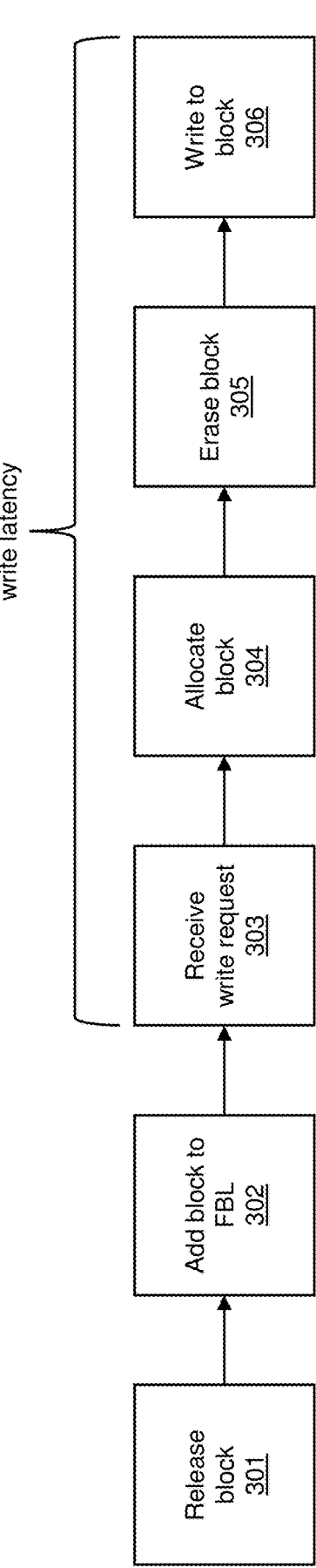
FIG. 3 shows a conceptual block diagram that illustrates a write latency associated with a first write process to NAND flash memory in accordance with aspects of the present disclosure.

FIG. 3 shows a conceptual block diagram that illustrates a write latency associated with a first write process to NAND flash memory in accordance with various aspects of this disclosure. Operations described with respect to FIG. 3 may be performed by NVM 72 of FIG. 2A, for example by control circuitry included in NVM 72. At operation 301, NVM 72 releases a block in its NAND flash memory. In one example, the release of the block may be based on the data stored in the block being deemed no longer valid. At operation 302, NVM 72 adds the block that was released at operation 301 to a free block list (FBL). In embodiments, the FBL is a list of blocks in the NAND flash memory that currently store invalid data and are available to be allocated for storing other data. At operation 303, NVM 72 receives a write request from control circuitry 22 (of FIG. 2A) to write metadata to a block of the NAND flash memory. At operation 304, in response to the write request received at operation 303, NVM 72 allocates a block in the NAND flash memory for storing the metadata included in the write request. At operation 305, NVM 72 erases the block of the NAND flash memory that was allocated at operation 304. The erasing may be performed using NAND flash memory erase techniques such as Fowler-Nordheim tunneling, for example. At operation 306, NVM 72 writes the metadata of the write request (from operation 303) to the block that was erased at operation 305. As can be seen from FIG. 3, the write latency associated with this method of writing to the NAND flash memory includes the time spent performing operations 303, 304, 305, and 306. The time spent erasing the block at operation 305, which is referred to herein as erase latency, can amount to five milliseconds in some examples.

Figure 4:
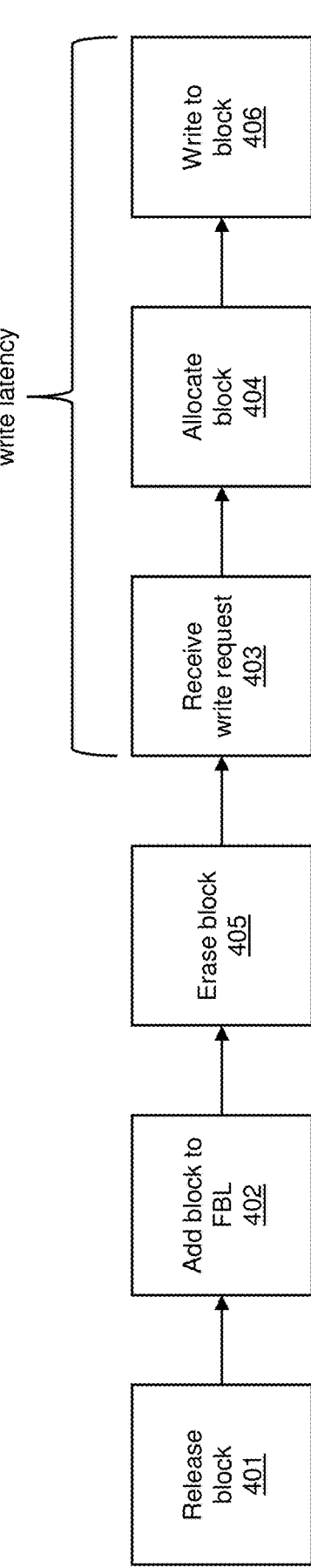
FIG. 4 shows a conceptual block diagram that illustrates a write latency associated with a second write process to NAND flash memory in accordance with aspects of the present disclosure.

FIG. 4 shows a conceptual block diagram that illustrates a write latency associated with a second write process to NAND flash memory in accordance with various aspects of this disclosure. Operations described with respect to FIG. 4 may be performed by NVM 72 of FIG. 2A, for example by control circuitry included in NVM 72. At operation 401, NVM 72 releases a block in its NAND flash memory. At operation 402, NVM 72 adds the block that was released at operation 401 to a free block list (FBL). Operations 401 and 402 may be performed in a manner similar to operations 301 and 302, respectively. At operation 405, NVM 72 erases a block of the NAND flash memory that is included in the FBL, e.g., using NAND flash memory erase techniques such as Fowler-Nordheim tunneling. At operation 403, NVM 72 receives a write request from control circuitry 22 (of FIG. 2A) to write metadata to a block of the NAND flash memory. At operation 404, in response to the write request received at operation 403, NVM 72 allocates a block in the NAND flash memory for storing the metadata included in the write request. In embodiments, the block that is allocated at operation 404 is the block that was erased at operation 405. At operation 406, NVM 72 writes the metadata of the write request (from operation 403) to the block that was allocated at operation 404. As can be seen from FIG. 4, the write latency associated with this method of writing to the NAND flash memory includes the time spent performing operations 403, 404, and 406. As shown in FIG. 4 and in accordance with aspects of the present disclosure, NVM 72 opportunistically performs the erase at operation 405 prior to receiving the write request at operation 403. In this manner, the write latency of the second write process shown in FIG. 4 includes the time spent performing operations 403, 404, and 406, but does not include the erase latency involved with performing operation 405. In this manner, the write latency of the second write process of FIG. 4 is lower than (i.e., less than) the write latency of the first write process of FIG. 3, which provides an improvement in the performance of the disk drive 15.

In accordance with aspects of the present disclosure, and with continued reference to FIGS. 2A and 4, pre-erase control circuitry 24 triggers NVM 72 to perform operation 405 (i.e., erasing of one or more blocks of NAND flash memory) when NVM 72 is otherwise idle. In one example, pre-erase control circuitry 24 issues commands to NVM 72 that cause NVM 72 to perform operation 405 during a seek operation associated with a read command, referred to herein as a read seek. The read command may be a read command received from host 44 for reading user data from one of the disks 16 of disk drive 15. During a read seek, control circuitry 22 controls VCM 20 to move one of the actuator arms 40 over a corresponding disk surface 17 prior to reading data from a portion of the disk surface 17. In various embodiments, pre-erase control circuitry 24 determines whether a particular read seek is of a sufficiently long duration to permit NVM 72 to perform operation 405 during the read seek. In these embodiments, in response to pre-erase control circuitry 24 determining that a particular read seek does have a sufficiently long duration, pre-erase control circuitry 24 provides NVM 72 with an erase window during which NVM 72 may perform operation 405. In these embodiments, pre-erase control circuitry 24 indicates a start of the erase window to NVM 72 by issuing a first command to NVM 72 and indicates an end of the erase window by issuing a second command to NVM 72. In these embodiments, NVM 72 performs the erasing of one or more blocks at operation 405 only during the time between NVM 72 receiving the first command and the second command. During this time between the first command and the second command, NVM 72 attempts to erase as many blocks as possible from a list of blocks to-be-erased, the list being maintained by NVM 72. At the conclusion of this time, as indicated by NVM 72 receiving the second command, NVM 72 ceases attempting to erase any blocks in the NAND flash memory. In this manner, pre-erase control circuitry 24 controls the timing of NVM 72 performing operation 405 to be in a synchronous manner with other operations controlled by control circuitry 22.

In accordance with aspects of the present disclosure, pre-erase control circuitry 24 determines whether a read seek is of a sufficiently long duration (i.e., to permit NVM 72 to perform operation 405 during the read seek) by comparing a seek time determined for the read seek to a threshold value. In various embodiments, the threshold value is an amount of time required to perform an erase operation of one block of the NAND flash memory of NVM 72. In a particular embodiment, the threshold value is an amount of time required to perform an erase operation of one SLC block of the NAND flash memory of NVM 72. In these embodiments, the amount of time required to perform an erase operation of one block (e.g., one SLC block) in the NAND flash memory is determined during manufacture and testing of disk drive 15 and may be stored, e.g., in firmware that is included in or accessible by pre-erase control circuitry 24. In embodiments, a read seek is determined to be of sufficiently long duration based on a seek time of the read seek being greater than or equal to the threshold value, and a read seek is determined to not be of sufficiently long duration based on the seek time of the read seek being less than the threshold value.

In various embodiments, control circuitry 22 determines a seek time of a read command. In one example, control circuitry 22 determines the seek time by estimating the seek time using a seek time model. A seek time model used with a particular disk drive may be determined empirically during manufacture and testing of the drive and may comprise, for example, one or more curves and/or one or more equations derived from averaging plural measurements of seek time versus seek length in the drive. In various examples, the seek time determined using the seek time model is a time corresponding to a distance that a head (such as head 18A) must travel radially over the disk from a current position of the head to a target track associated with the read command. In addition to the time the head must travel radially over the disk, the seek time determined using the seek time model may also include a time corresponding to an angle the disk must rotate, while the head is over the target track, before the head reaches the first target data sector associated with the host read command. The seek time model may include additional variables not mentioned here in order to estimate the seek time associated with a read command.

In accordance with some embodiments, pre-erase control circuitry 24 defines an erase window for NVM 72 by issuing the first command and the second command to NVM 72 during a read seek associated with reading data from one of the disks 16, but not during a write seek. In various examples, the erase window coincides with a read seek because a NAND typically remains idle during a read seek. In these embodiments, control circuitry 22 may be configured to limit operations performed by NVM 72 during a write operation to one of the disks 16, including during a write seek associated with such a write operation, so that NVM 72 is immediately available for an EPO operation should the need arise.

In various embodiments, the first command and the second command that pre-erase control circuitry 24 uses to define the erase window for NVM 72 comprise commands formatted as universal flash storage (UFS) protocol information units (UPIU). In embodiments, the first command is a "set flag" UPIU command that indicates the start of the erase window to NVM 72, and the second command is a "clear flag" UPIU command that indicates the end of the erase window to NVM 72. In embodiments, NVM 72 begins performing operation 405 of FIG. 4 (i.e., erasing of one or more blocks of NAND flash memory) in response to receiving the "set flag" UPIU command, and NVM 72 ceases performing operation 405 in response to receiving the "clear flag" UPIU command. In this manner, pre-erase control circuitry 24 may use commands, such as UPIU commands, to control when NVM 72 performs operation 405 of FIG. 4.

In accordance with some embodiments, NVM 72 erases only SLC blocks of the NAND flash memory as part of performing operation 405 of FIG. 4. SLC blocks are written to, erased, and re-written in NAND flash memory more frequently than TLC blocks. In contrast to SLC blocks, TLC blocks are typically written to very few times during the life of a disk drive. TLC blocks included in NAND flash memory of NVM 72 may, in some cases, be written to only once, for example, during manufacturing of disk drive 15. As a result, in some embodiments, NVM 72 does not erase TLC blocks while performing operation 405, and instead erases only SLC blocks while performing this operation. However, in other embodiments, NVM 72 could optionally be programmed to erase blocks of any type (e.g., SLC, TLC, MLC, and QLC) during operation 405.

In accordance with aspects of the present disclosure, NVM 72 maintains one or more data structures that include data that define which of the blocks of the NAND flash memory hold valid data, which of the blocks of the NAND flash memory hold invalid data, which of the blocks of the NAND flash memory are erased, which of the blocks of the NAND flash memory are not erased, and which of the blocks of the NAND flash memory are to-be-erased. In one example, NVM 72 maintains a free block list including data that indicates the blocks of the NAND flash memory that hold valid data and the blocks of the NAND flash memory that hold invalid data. In one example, NVM 72 maintains a bitmap including data that indicates blocks of the NAND flash memory that are erased and blocks of the NAND flash memory that are not erased. In one example, NVM 72 maintains a "to-be-erased" list including data that indicates blocks of the NAND flash memory that are available for erasing via operation 405 of FIG. 4. These data structures may be maintained separately or combined.

In accordance with aspects of the present disclosure, NVM 72 is configured to receive a write request from the one or more processing devices for writing metadata to NVM 72 and, in response to receiving the write request, write the metadata to a pre-erased block in NVM 72. In embodiments, when control circuitry 22 sends a write request to NVM 72 for writing metadata, NVM 72 allocates a block to which the metadata will be written. In embodiments, NVM 72 selects the block for allocation from the free block list based on one or more factors such as least program/erase count (PEC). In accordance with the inventive approach of performing block pre-erase during sufficiently long seek operations, NVM 72 gives preference to allocating a pre-erased block over a non-erased block when all other factors, such as PEC, are the same between the available blocks. In the event that a pre-erased block is selected for the write request, then the write process proceeds according to operations 404 and 406 of FIG. 4. In the event that a pre-erased block is not selected for the write request, then the write process proceeds according to operations 304, 305, and 306 of FIG. 3.

In accordance with aspects of the present disclosure, control circuitry 22 including pre-erase control circuitry 24 is configured to: in response to determining that a seek time associated with a seek operation exceeds a threshold, send a first command to NVM 72; and at or before an end of the seek operation, send a second command to NVM 72, wherein the NVM 72 is configured to begin performing a pre-erase operation of one or more blocks in NVM 72 in response to receiving the first command, and the NVM 72 is configured to cease performing the pre-erase operation in response to receiving the second command. In embodiments and as described herein, NVM 72 may comprise NAND flash memory, and the one or more blocks may comprise one or more SLC blocks of the NAND flash memory. In embodiments and as described herein, the seek operation may be associated with a read operation of data stored on one or more disks 16 of disk drive 15. In embodiments and as described herein, the one or more disks store user data, and NVM 72 stores metadata associated with the disk drive 15. In embodiments and as described herein, the threshold is based on an amount of time needed to erase a single block of the non-volatile memory, and the amount of time may be predetermined and programmed in the disk drive 15. In embodiments and as described herein, the first command and the second command may comprise UPIU commands and may define a window for performing the pre-erase operation. In embodiments and as described herein, the performing the pre-erase operation comprises erasing the one or more blocks prior to the one or more blocks being allocated for a write operation, e.g., as illustrated in FIG. 4.

In accordance with additional aspects of the present disclosure, NVM 72 is further configured to perform another pre-erase operation of another one or more blocks of NVM 72 during background operations of NVM 72. In embodiments, NVM 72 may be configured to periodically perform background operations (BKOPS) that may include but are not limited to wear leveling, bad block management, and error correction. In one example, control circuitry 22 instructs NVM 72 when to begin and when to cease performing the background operations, e.g., using particular UPIU commands similar to those described herein. In embodiments, NVM 72 may be configured to perform operation 405 of FIG. 4 (i.e., erasing of one or more blocks of NAND flash memory) during the time defined for such background operations.

Figure 5:
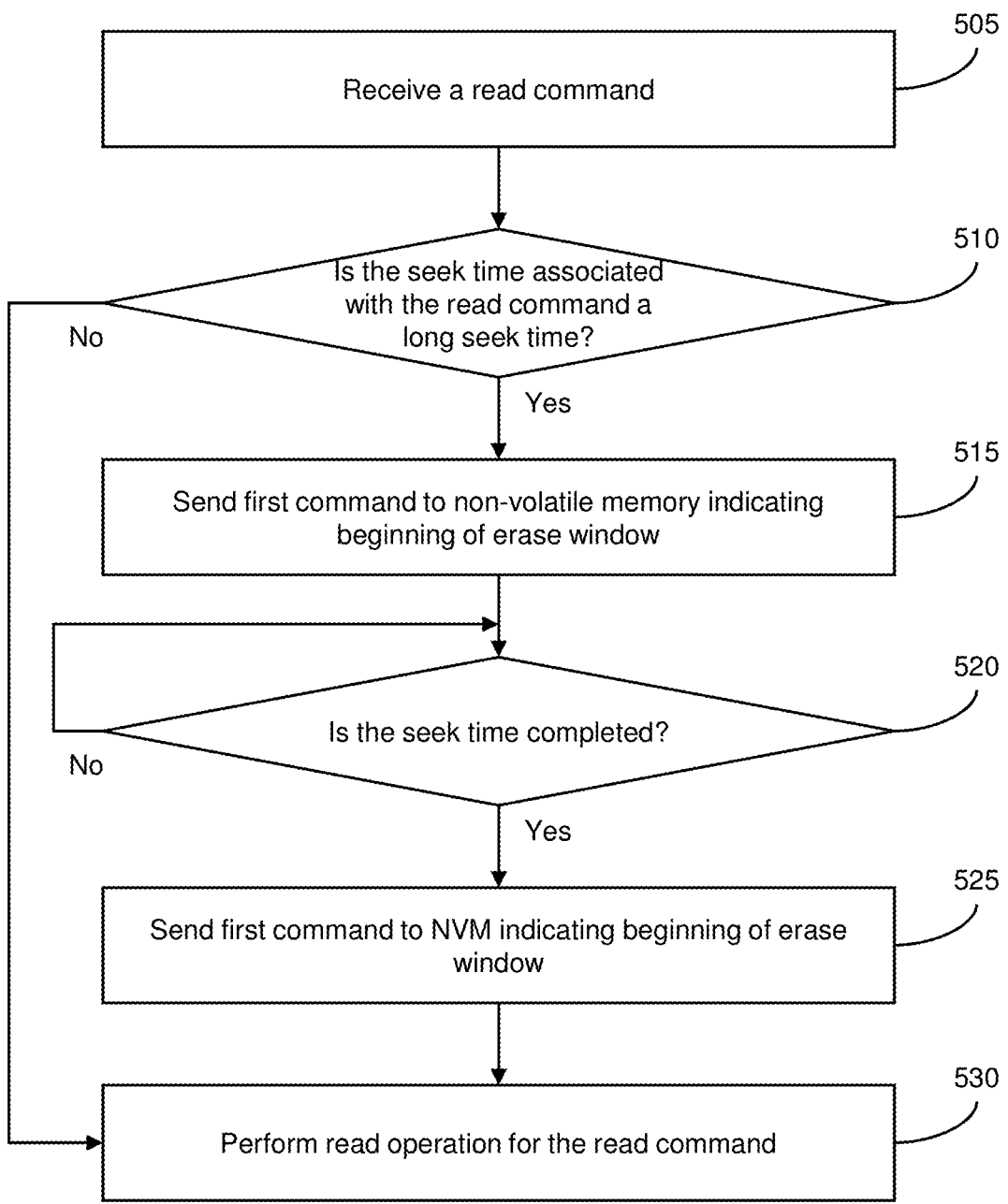
FIG. 5 shows a flowchart of an exemplary method in accordance with aspects of the present disclosure.

FIG. 5 shows a flowchart of an exemplary method in accordance with aspects of the present disclosure. Operations of the method may be performed by control circuitry 22 including pre-erase control circuitry 24 of disk drive 15 of FIG. 2A and are described with reference to elements depicted in FIGS. 2A and 2B.

At step 505, control circuitry 22 receives a read command, e.g., from host 44. In one example, the read command is a command to read data stored on one of disks 16 of disk drive 15. At step 510, control circuitry 22 (including pre-erase control circuitry 24) determines whether a seek time associated with the read command (from step 505) is a long seek time, i.e., of a sufficiently long duration to permit pre-erasing of one or more blocks of NVM 72. In embodiments, control circuitry 22 (including pre-erase control circuitry 24) determines a seek time for the read command and compares the determined seek time to a threshold, which may be a predetermined amount of time needed to erase one block of NAND flash memory in NVM 72. In the event the seek time is a long seek time, then at step 515 control circuitry 22 (including pre-erase control circuitry 24) sends a first command to NVM 72, the first command indicating a beginning of an erase window. In one example, the first command comprises a set flag UPIU command. In some embodiments NVM 72 may be configured to respond to the first command of step 515 by sending a message to control circuitry 22 (including pre-erase control circuitry 24), the message indicating whether NVM 72 has any blocks in its to-be-erased list.

At step 520, control circuitry 22 (including pre-erase control circuitry 24) determines whether the seek time (determined at step 515) is completed. In one example, control circuitry 22 (including pre-erase control circuitry 24) compares an actual time elapsed to the determined seek time. If the seek time is not completed, then the process loops back to step 520. If the seek time is completed, i.e., meaning that the seek operation for the read command from step 505 is finished, then at step 525, control circuitry 22 (including pre-erase control circuitry 24) sends a second command to NVM 72, the second command indicating an end of the erase window. In one example, the second command comprises a clear flag UPIU command. At step 530, control circuitry 22 performs a read operation to complete the read command of step 505. If at step 510 the seek time is determined to not be a long seek time, then the process goes directly to step 530 without triggering an erase window for NVM 72 to perform pre-erase operations.

Figure 6:
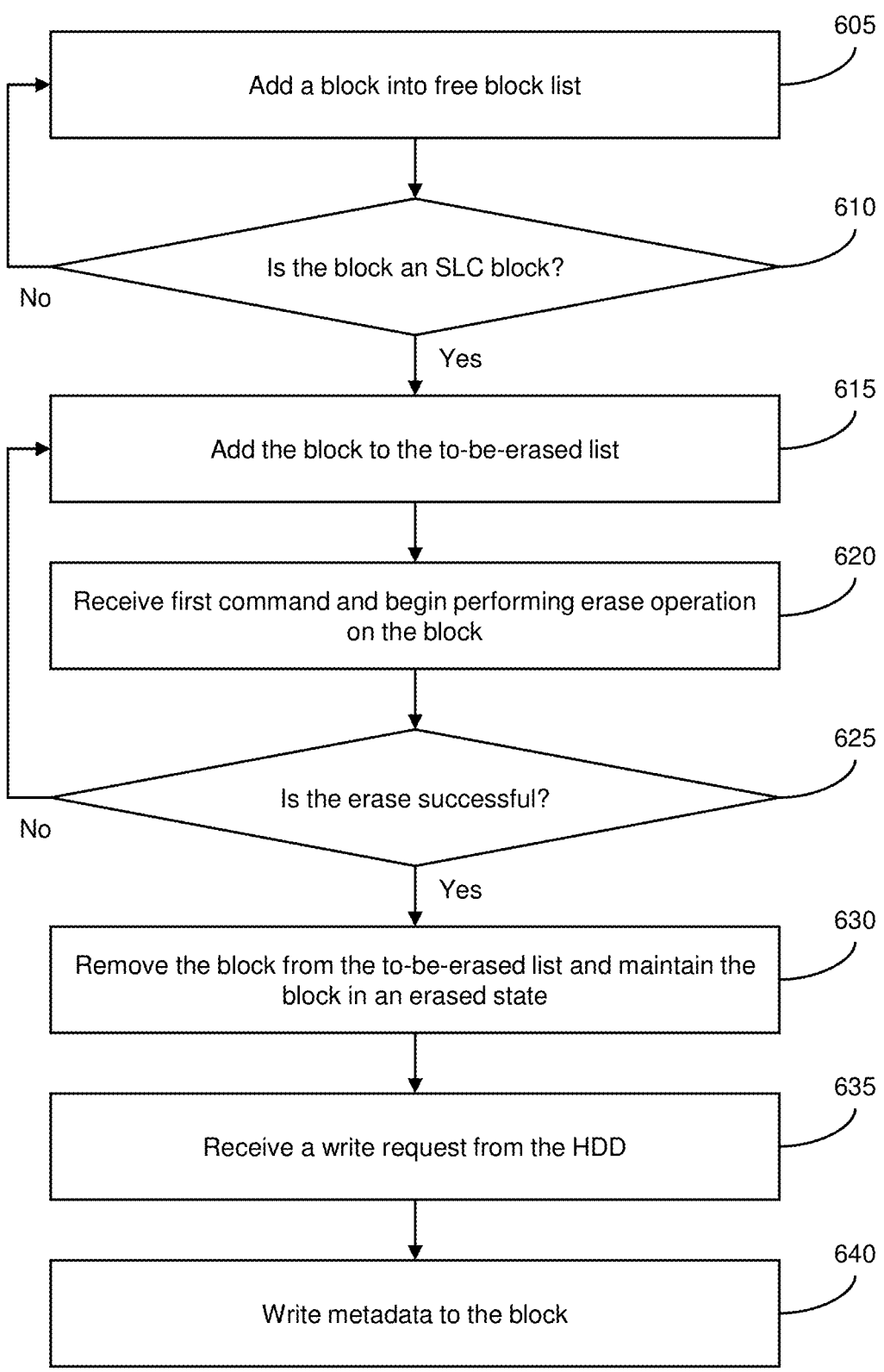
FIG. 6 shows a flowchart of an exemplary method in accordance with aspects of the present disclosure.

FIG. 6 shows a flowchart of an exemplary method in accordance with aspects of the present disclosure. Operations of the method may be performed by NVM 72 in disk drive 15 of FIG. 2A and are described with reference to elements depicted in FIGS. 2A and 2B.

At step 605, NVM 72 adds a block of the NAND flash memory to its free block list. In one example, the block is added to the free block list in response to an indication that the block contains invalid data. At step 610, NVM 72 determines whether the block from step 605 is an SLC block. In some embodiments, if the block is not an SLC block, then the block is not a candidate for pre-erasing, and the process returns to step 605 to wait for a next block to be added to the free block list. In embodiments, if the block is an SLC block, then at step 615 NVM 72 adds this block to the to-be-erased list.

At step 620, in response to receiving the first command (e.g., the set flag command) from pre-erase control circuitry 24, NVM 72 begins performing an erase operation on the block. In one example, NVM 72 controls the NAND flash memory to perform an erase operation on the block according to predefined block erase programming. At step 625, NVM 72 determines whether the erase of the block, due to the erase operation of step 620, was successful. If the erase was not successful, then the process returns to step 615, with this block being retained in the to-be-erased list. If the erase was successful, then the block is removed from the to-be-erased list and maintained in the erased state in step 630. At step 635, NVM 72 receives a write request from the HDD (e.g., from control circuitry 22) to write metadata to the NAND flash memory. At step 640, NVM 72 writes the metadata to the block that was erased at step 620. In embodiments, if no blocks are already erased when NVM 72 receives the write request at step 635, then NVM 72 handles the write request in a manner similar to that shown in FIG. 3.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations fall within the scope of this disclosure. Certain method, event, or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions, and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a central processing unit (CPU), a field-programmable gate array (FPGA), an SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B, and C" is intended to mean "either A, B, C, or any combination of A, B, and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   a non-volatile memory;
   an actuator mechanism configured to position a selected head among one or more heads proximate to a corresponding disk surface of a corresponding disk among the one or more disks; and
   one or more processing devices, individually or in combination, configured to:
      send a first command to the non-volatile memory in response to determining that a seek time associated with a seek operation exceeds a threshold; and
      send a second command to the non-volatile memory at or before an end of the seek operation;
   wherein the non-volatile memory is configured to:
      in response to receiving the first command, begin performing a pre-erase operation of one or more blocks in the non-volatile memory; and
      in response to receiving the second command, cease performing the pre-erase operation.

2. The data storage device of claim 1, wherein the non-volatile memory comprises NAND flash memory.

3. The data storage device of claim 2, wherein the one or more blocks comprise one or more blocks in the NAND flash memory.

4. The data storage device of claim 2, wherein the one or more blocks comprise one or more single level cell (SLC) blocks in the NAND flash memory.

5. The data storage device of claim 1, wherein the seek operation is associated with a read operation of data stored on the one or more disks.

6. The data storage device of claim 1, wherein:
   the one or more disks are configured to store user data; and
   the non-volatile memory is configured to store metadata associated with the data storage device.

17

7. The data storage device of claim 1, wherein the threshold is based on an amount of time to erase a single block of the non-volatile memory.

8. The data storage device of claim 7, wherein the amount of time is predetermined and programmed in the data storage device.

9. The data storage device of claim 1, wherein the first command and the second command define a window for performing the pre-erase operation.

10. The data storage device of claim 1, wherein the performing the pre-erase operation comprises erasing the one or more blocks prior to the one or more blocks being allocated for a write operation.

11. The data storage device of claim 1, wherein the non-volatile memory is further configured to:
   receive a write request from the one or more processing devices for writing metadata to the non-volatile memory; and
   in response to receiving the write request, write the metadata to a pre-erased block in the non-volatile memory.

12. The data storage device of claim 1, wherein the non-volatile memory is further configured to perform another pre-erase operation of another one or more blocks of the non-volatile memory during background operations of the non-volatile memory.

13. A method comprising:
   sending a first command to a non-volatile memory in a data storage device that comprises one or more disks, wherein the sending the first command is in response to a seek time associated with a seek operation exceeding a threshold; and
   sending a second command to the non-volatile memory at or before an end of the seek operation,
   wherein the non-volatile memory is configured to:
      in response to receiving the first command, begin performing a pre-erase operation of one or more blocks in the non-volatile memory; and
      in response to receiving the second command, cease performing the pre-erase operation; and
   wherein the sending the first command and the sending the second command are performed by one or more processing devices individually or in combination.

14. The method of claim 13, wherein:
   the non-volatile memory comprises NAND flash memory; and
   the one or more blocks comprise one or more blocks in the NAND flash memory.

15. The method of claim 13, wherein the seek operation is associated with a read operation of data stored on the one or more disks.

16. The method of claim 13, wherein the one or more disks are configured to store user data and the non-volatile memory is configured to store metadata associated with the data storage device.

17. One or more hardware processing devices comprising, individually or in combination:
   means for sending a first command to a non-volatile memory in response to determining that a seek time associated with a seek operation exceeds a threshold; and
   means for sending a second command to the non-volatile memory at or before an end of the seek operation,
   wherein the non-volatile memory is configured to:
      in response to receiving the first command, begin performing a pre-erase operation of one or more blocks in the non-volatile memory; and
      in response to receiving the second command, cease performing the pre-erase operation.

18. The one or more hardware processing devices of claim 17, wherein the first command and the second command define a window for performing the pre-erase operation.

19. The one or more hardware processing devices of claim 18, wherein the performing the pre-erase operation comprises erasing the one or more blocks prior to the one or more blocks being allocated for a write operation.

20. The one or more hardware processing devices of claim 18, further comprising, individually or in combination:
   means for receiving a write request for writing metadata to the non-volatile memory; and
   means for writing, in response to receiving the write request, the metadata to a pre-erased block in the non-volatile memory.

* * * * *